(12) United States Patent
Hying et al.

(10) Patent No.: US 11,596,904 B2
(45) Date of Patent: Mar. 7, 2023

(54) COMPOSITE BODY

(71) Applicant: Evonik Operations GmbH, Essen (DE)

(72) Inventors: Christian Hying, Rhede (DE); David Grzenia, Recklinghausen (DE); Rolf-Walter Terwonne, Marl (DE); Bastian Matthias Brugger, Duisburg (DE); Kira Khaletskaya, Düsseldorf (DE); Oliver Conradi, Düsseldorf (DE); Hans-Jürgen Nettelnbreker, Haltern (DE); Alexander Paasche, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 172 days.

(21) Appl. No.: 16/702,752

(22) Filed: Dec. 4, 2019

(65) Prior Publication Data

US 2020/0197877 A1 Jun. 25, 2020

(30) Foreign Application Priority Data

Dec. 20, 2018 (EP) .................................. 18214644

(51) Int. Cl.
*B01D 69/14* (2006.01)
*B01D 53/22* (2006.01)
(Continued)

(52) U.S. Cl.
CPC ......... *B01D 69/148* (2013.01); *B01D 53/228* (2013.01); *B01D 69/12* (2013.01);
(Continued)

(58) Field of Classification Search
None
See application file for complete search history.

(56) References Cited

U.S. PATENT DOCUMENTS 6,299,668 B1 10/2001 Penth et al.
6,299,778 B1 10/2001 Penth et al.
(Continued)

FOREIGN PATENT DOCUMENTS

DE 198 38 800 C1 3/2000
DE 10139559 A1 2/2003
(Continued)

OTHER PUBLICATIONS

European Search Report dated Jun. 19, 2019 in EP 18 21 4644 (8 pages).

*Primary Examiner* — Jason M Greene
(74) *Attorney, Agent, or Firm* — Taylor English Duma LLP; Philip P. McCann (57) ABSTRACT

The present invention provides a composite body having, on a porous substrate and in the interstices of the substrate that includes fibers, preferably of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, where the oxide particles present in layer (1) have a greater median particle size than the oxide particles present in layer (2), which is characterized in that the median particle size ($d_{50}$) of the oxide particles in layer (1) is from 0.5 to 4 μm and the median particle size ($d_{50}$) of the oxide particles in layer (2) is from 0.015 to 0.15 μm, preferably 0.04 to 0.06 μm, a process for producing corresponding composite bodies and for the use thereof, especially in gas separation.

21 Claims, 2 Drawing Sheets

(51) Int. Cl.
*B01D 69/12* (2006.01)
*B01D 71/02* (2006.01)
*B01D 71/32* (2006.01)

(52) U.S. Cl.
CPC .......... *B01D 71/027* (2013.01); *B01D 71/32* (2013.01); *B01D 2323/18* (2013.01); *B01D 2323/28* (2013.01); *B01D 2323/46* (2013.01); *B01D 2325/20* (2013.01)

(56) References Cited

U.S. PATENT DOCUMENTS

| | | | |
|---|---|---|---|
| 6,309,545 | B1 | 10/2001 | Penth et al. |
| 6,340,379 | B1 | 1/2002 | Penth et al. |
| 6,362,606 | B1 | 3/2002 | Dupuis et al. |
| 6,383,386 | B1 | 5/2002 | Hying et al. |
| 6,620,320 | B1 | 9/2003 | Hying et al. |
| 6,840,175 | B2 | 1/2005 | Penth et al. |
| 7,351,494 | B2 | 4/2008 | Hennige et al. |
| 7,525,788 | B2 | 4/2009 | Hoerpel et al. |
| 7,575,832 | B2 | 8/2009 | Hennige et al. |
| 7,655,360 | B2 | 2/2010 | Hennige et al. |
| 7,682,731 | B2 | 3/2010 | Hennige et al. |
| 7,691,528 | B2 | 4/2010 | Hennige et al. |
| 7,691,529 | B2 | 4/2010 | Hennige et al. |
| 7,709,140 | B2 | 5/2010 | Hoerpel et al. |
| 7,790,321 | B2 | 9/2010 | Hennige et al. |
| 7,807,286 | B2 | 10/2010 | Henninge et al. |
| 7,811,700 | B2 | 10/2010 | Hennige et al. |
| 7,829,242 | B2 | 11/2010 | Horpel et al. |
| 7,858,222 | B2 | 12/2010 | Hennige et al. |
| 7,892,673 | B2 | 2/2011 | Hennige et al. |
| 7,959,011 | B2 | 6/2011 | Hennige et al. |
| 7,960,061 | B2 | 6/2011 | Jost et al. |
| 8,016,896 | B2 | 9/2011 | Hennige et al. |
| 8,053,102 | B2 | 11/2011 | Hennige et al. |
| 8,105,733 | B2 | 1/2012 | Hoerpel et al. |
| 8,142,920 | B2 | 3/2012 | Hennige et al. |
| 8,163,441 | B2 | 4/2012 | Hoerpel et al. |
| 8,173,305 | B2 | 5/2012 | Holzapfel et al. |
| 8,337,974 | B2 | 12/2012 | Hennige et al. |
| 8,568,865 | B2 | 10/2013 | Nun et al. |
| 8,597,819 | B2 | 12/2013 | Hennige et al. |
| 8,709,638 | B2 | 4/2014 | Hennige et al. |
| 9,214,659 | B2 | 12/2015 | Horpel et al. |
| 9,782,728 | B2 | 10/2017 | Pascaly et al. |
| 10,044,015 | B2 | 8/2018 | Hennige et al. |
| 10,566,593 | B2 | 2/2020 | Hying et al. |
| 2002/0023419 | A1 | 2/2002 | Penth et al. |
| 2002/0038602 | A1* | 4/2002 | Nelson ................ B01D 53/228 95/45 |
| 2002/0039648 | A1 | 4/2002 | Horpel et al. |
| 2003/0233934 | A1* | 12/2003 | Wijmans ............... B01D 71/32 95/46 |
| 2004/0028913 | A1 | 2/2004 | Hennige et al. |
| 2004/0038105 | A1 | 2/2004 | Hennige et al. |
| 2004/0262169 | A1 | 12/2004 | Hying et al. |
| 2005/0070193 | A1* | 3/2005 | Hennige ............... B01D 53/228 442/341 |
| 2005/0087491 | A1 | 4/2005 | Hennige et al. |
| 2005/0172811 | A1* | 8/2005 | Oyama ................ B01D 71/027 96/4 |
| 2006/0078791 | A1 | 4/2006 | Hennige et al. |
| 2008/0190841 | A1 | 8/2008 | Pascaly et al. |
| 2008/0274394 | A1 | 11/2008 | Schormann et al. |
| 2009/0269489 | A1 | 10/2009 | Hennige et al. |
| 2010/0024614 | A1 | 2/2010 | Rex et al. |
| 2010/0028778 | A1 | 2/2010 | Schuch et al. |
| 2010/0212504 | A1* | 8/2010 | Shimizu ................ B01D 69/10 96/13 |
| 2012/0248381 | A1 | 10/2012 | Hennige et al. |
| 2012/0308871 | A1 | 12/2012 | Pascaly et al. |
| 2014/0044878 | A1 | 2/2014 | Nun et al. |
| 2014/0127546 | A1 | 5/2014 | Pascaly et al. |
| 2015/0017512 | A1 | 1/2015 | Terwonne et al. |
| 2016/0045859 | A1* | 2/2016 | Zhang ................ B01D 53/228 95/47 |
| 2016/0064712 | A1 | 3/2016 | Hoerpel et al. |
| 2018/0111158 | A1* | 4/2018 | Tanikawa ............... B01D 69/12 |

FOREIGN PATENT DOCUMENTS

| | | |
|---|---|---|
| DE | 10255121 A1 | 6/2004 |
| EP | 1925047 A1 | 5/2008 |
| EP | 2773458 A1 | 9/2014 |
| WO | 99/15257 A1 | 4/1999 |
| WO | 2002/047801 A1 | 6/2002 |
| WO | 2005/038959 A1 | 4/2005 |
| WO | 2007/028662 A1 | 3/2007 |
| WO | 2007/149640 A1 | 12/2007 |
| WO | 2013/066941 A1 | 5/2013 |
| WO | 2017/106866 A1 | 6/2017 |

* cited by examiner

COMPOSITE BODY

CROSS REFERENCE TO RELATED APPLICATIONS

This application is a 35 U.S.C. § 119 patent application which claims the benefit of European Application No. 18214644.9 filed Dec. 20, 2018, which is incorporated herein by reference in its entirety.

FIELD

The present invention relates to a composite body having, on a porous substrate and in the interstices of the substrate that includes fibers, preferably of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, where the oxide particles present in layer (1) have a greater median particle size than the oxide particles present in layer (2), which is characterized in that the median particle size ($d_{50}$) of the oxide particles in layer (1) is from 0.5 to 4 µm and the median particle size ($d_{50}$) of the oxide particles in layer (2) is from 0.015 to 0.15 µm, preferably 0.04 to 0.06 µm, to a process for producing corresponding composite bodies and to the use thereof, especially in gas separation.

BACKGROUND

In the production of natural gas, more and more deposits that also contain a high proportion of further accompanying substances as well as methane are also being exploited. A portion of these accompanying substances can remain in the natural gas; and another portion must be removed in the course of natural gas processing. The latter include those substances that can cause corrosion in conduits and vessels, but also substances that reduce the calorific value of the gas. Components that are removed or distinctly lowered in their concentration, if present in excess, are typically water, carbon dioxide, nitrogen, mercury and hydrogen sulfide. In the context of this document, the removal of carbon dioxide is of particular relevance. The state of the art is removal by means of an amine scrubbing, by which nowadays about 90% of the natural gas is cleaned. It is to be expected that the proportion of unwanted accompanying substances in the gases produced will distinctly increase in the future. The first sources with up to 50% $CO_2$ are being exploited, for example, in Asia.

Since, in the case of an amine scrubbing, the amine has to be regenerated again by a desorption with use of energy after sorption of the carbon dioxide, there has recently also been increasing use of membranes for removal of large proportions of these impurities. The use of membranes has the advantage that smaller plants (requiring less space), simple operation and no liquid chemicals can/must be used.

The most commonly used membranes are produced and employed as asymmetric polymer membranes in the form of hollow fiber membranes or flat membranes made of cellulose acetates. However, the separation performance of the cellulose acetate membranes in use decreases owing to various effects, and so the separation implemented in use frequently does not achieve a sufficiently large separation factor, or has a distinctly negative difference therefrom after prolonged operation. There are therefore various activities for improving the separation factor (or clean gas selectivity), for example by modifying polymers.

The decrease in the separation performance in real application can be attributed in many cases to the sorption of higher hydrocarbons (defined here as hydrocarbons of more than 5 carbon atoms) in the polymer and the associated softening of the polymers. This effect is distinctly reduced, or barely exists, in the case of perfluorinated polymers. Therefore, these polymers are of good suitability as selective material for separation tasks in which higher hydrocarbons are present in the gas in a proportion close to the dew point for these compounds.

The production of an asymmetric membrane consisting entirely of fluoropolymers is economically unviable, and so exclusively composite membranes having a minimal proportion of a fluorinated polymer are viable for the applications. However, the substructure here should be chosen such that this is also not altered by the impurities mentioned. As a result, virtually all polymers are not an option for this purpose.

In WO 2007/149640 A2, the company Porogen proposed applying a fluoropolymer layer atop a porous PEEK carrier (PEEK film). A challenge here was the binding of the fluoropolymers via functional groups to the carrier.

DE 198 38 800 proposes an electrical separator with the composite structure that comprises a two-dimensional, flexible substrate provided with a multitude of orifices and having a coating present thereon. The material of the substrate is selected from metals, alloys, plastics, glass and carbon fibers or a combination of such materials, and the coating is a two-dimensionally continuous, porous, electrically nonconductive ceramic coating. The use of the ceramic coating promises thermal and chemical stability.

The fact that such composite bodies can be modified with polymers is described, for example, by EP 1925047 A1. However, the polymers used therein are to have essentially spherical structures and to be within the composite body.

Professor James Economy's group published a report about a research project for production of thin film composite (TFC) membranes, in which a selected layer is applied to a porous support, for example a polysulfone or ceramic membrane (http://economy.matse.illinois.edu/membrane.htm).

DE 10139559 A1 describes hybrid membranes in which ceramic materials are modified with organic separation layers. These are said to have better long-term stability than membranes with carriers made of polymers, but have an uneven polymer surface. DE 10208278 A1 describes similar hybrid membranes in which, however, the ceramic membranes are based on a polymeric carrier material, especially polymer nonwoven.

Multilayer, essentially ceramic composite materials are also already known from DE 10255121 A1. The composite materials described therein are used as battery separators.

SUMMARY

The problem addressed by the present invention was that of providing a carrier material suitable for the production of composite membranes having separation-active layers based on polymers, and preferably not having one or more of the disadvantages of the carrier materials known from the prior art.

It has now been found that, surprisingly, by multiple application of oxide particle layers, it is possible to obtain composite bodies that have a very smooth surface and, when used as carrier materials for polymeric separation layers, lead to uniform polymer surfaces.

The present invention therefore provides composite bodies, a process for producing composite bodies and for the use of these composite bodies as claimed in the claims and described in detail hereinafter.

DETAILED DESCRIPTION

The present invention more particularly provides a composite body having, on a porous substrate and in the interstices of the substrate that includes fibers, preferably of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, where the oxide particles present in layer (1) have a greater median particle size than the oxide particles present in layer (2), which is characterized in that the median particle size ($d_{50}$) of the oxide particles in layer (1) is from 0.5 to 4 µm and the median particle size ($d_{50}$) of the oxide particles in layer (2) is from 0.015 to 0.01 µm, preferably 0.04 to 0.06 µm, a process for producing corresponding composite bodies and for the use thereof, especially in gas separation.

The composite bodies of the invention have the advantage of having a very smooth surface with fine pores, such that it is possible to apply separation-active polymer layers or films that have a virtually uniform thickness at all points.

In addition, the composite body of the invention has the advantage that it can be, preferably is, sufficiently flexible that it can be processed further by the customary methods to give membrane modules, especially to give what are called spiral-wound modules. These membrane modules are the customary use form of membranes. These are aggregates that are easy to handle, by means of which the membrane installed therein can be introduced, for example, into industrial plants.

The composite bodies according to the invention that include a polymer layer or film containing or consisting of perfluorinated polymers may be suitable as gas separation membranes, especially for separation of $CO_2$ and methane. The clean gas selectivity ($CO_2/CH_4$) of this separation may be >10, preferably >13 to 23, determined at room temperature and feed pressure 30 bar.

In the context of the present invention, clean gas selectivity refers to the ratio of the gas flows of the clean gases in question in each case through a membrane under the same measurement conditions (membrane area, pressure and temperature), the numerator in each case being the gas having the lower gas flow. The gas flow through a membrane is typically reported in GPU (gas permeation units), corresponding to a permeating volume under standard conditions per unit area, unit time and unit pressure differential. A flow of one GPU corresponds to 0.0027 m³ (STP)/(m² h bar).

What can be achieved by virtue of the uniform thickness is that the entire surface of the separation-active layer (polymer layer) has no defects, for example holes, and homogeneous permeability at the surface. This is detectable by point flow measurements with the appropriate gases.

The (gas) flow through the gas separation membrane according to the invention may be greater than 20 GPU, preferably >50 GPU, for carbon dioxide. The homogeneous permeability of the surface of the gas separation membrane avoids preferential flow through some regions of the gas separation membrane, and impairment of these regions particularly rapidly by extraneous substances that are present in non-negligible concentrations in natural gas, for example, such as higher hydrocarbons or hydrogen sulfide, which would lead to a rapid drop in the separation performance in the corresponding subregions of the membrane.

The size of the oxide particles used achieves uniform impregnation of the substrate, which ensures that there are no resultant cavities and inclusions of air in the composite body. This ensures that the composite body does not become compacted under compressive stress and the pore structure of the composite body is not destroyed. Moreover, it is possible via the size of the oxide particles used to adjust the pore size of the composite body.

The use of the suitable combination of substrates including fibers, especially nonwoven substrates, in combination with the oxide particles can achieve a tensile strength of the composite body according to the invention of >40 N/m in machine direction.

The use of perfluorinated polymers for production of the separation-active layer can avoid any change in the separation properties in the presence of typical critical impurities, for example higher hydrocarbons, such as propane, butane or else benzene or toluene.

The composite body of the invention, the process according to the invention for producing a composite body and the use according to the invention of the composite body are described by way of example hereinafter, without any intention that the invention be restricted to these illustrative embodiments. Where ranges, general formulae or classes of compounds are specified hereinbelow, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Where figures are given in percent hereinbelow, these are percentages by weight unless otherwise stated. Where averages, for example molar mass averages, are reported hereinbelow, these are the numerical average unless otherwise stated. Where properties of a material are referred to hereinafter, for example viscosities, gas flows, selectivities or the like, these are properties of the material at 25° C. unless stated otherwise. Where chemical (empirical) formulae are used in the present invention, the specified indices may be not only absolute numbers but also average values. The indices relating to polymeric compounds are preferably average values.

The composite body according to the invention having, on a porous substrate and in the interstices of the substrate that includes fibers of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, more preferably selected from $Al_2O_3$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, more preferably selected from $Al_2O_3$ and $SiO_2$, where the oxide particles present in layer (1) have a greater median particle size than the oxide particles present in layer (2), is characterized in that the median particle size ($d_{50}$) of the oxide particles in layer (1) is from 0.5 to 4 μm and the median particle size ($d_{50}$) of the oxide particles in layer (2) is from 0.015 to 0.15 μm, preferably 0.04 to 0.06 μm.

The median particle size in the layers can be determined by taking scanning electron micrographs (for example with a JEOL JSM IT300 scanning electron microscope) and performing image evaluation. Alternatively, the particle size of the particles used, prior to the coating and consolidation in the dispersion, can also be determined by means of suitable instruments for particle size measurement (Mastersizer Hydro 2000S, Malvern Panalytical, Malvern, UK) by means of static light scattering, in accordance with ISO 13320. This instrument measures the size of particles with the aid of laser diffraction. For this purpose, the refractive index of the particles to be measured must be known and recorded in the software. For the measurement of the particle size distribution, the solid material to be measured is dispersed in demineralized water by means of stirring at 1750 rpm and, if required, with addition of ultrasound. A sufficiently large aliquot of the dispersed sample is pipetted into the dispersion module of the measuring instrument that the laser darkening is between 15% and 20%. The Mastersizer Hydro 2000S is used to measure the intensity of the light from two laser beams scattered by the sample (wavelength 633 nm and 466 nm). The three-dimensional distribution of the scattering intensities is evaluated by means of the Mie theory. This is used to ascertain the particle size and particle size distribution. The measurement results are also reported as a distribution curve; what is thus obtained is not just a statement as to the average particle size but also information as to the smallest and largest particles in the sample. The $d_{50}$ indicates the median particle size. $d_{50}$ in this connection refers to the diameter at which 50% of the volume-weighted size distribution is smaller than this diameter. Further parameters are accordingly the $d_{10}$ as a measure of the smallest particles in the sample, and $d_{90}$ as a measure of the larger particles. The closer $d_{10}$ and $d_{90}$ are together, the narrower the particle size distribution.

Particular preference is given to the oxide particles that include or consist of an oxide selected from $Al_2O_3$ and $SiO_2$. Very particularly preferred oxide particles having a median particle size ($d_{50}$) of 0.015 to 0.15 μm, preferably 0.04 to 0.06 μm, are those based on or consisting of $SiO_2$. Examples of particularly preferred oxide particles are pyrogenic oxide particles as supplied under the Aerosil® or Aeroxide® brand name by Evonik Resource Efficiency or comparable products from other suppliers.

The composite body according to the invention preferably has a Gurley number of 200 to 1700 sec, preferably 250 to 1200 sec and more preferably of 300 to 800 sec.

The Gurley number is a measure of the air permeability of a porous material. It is defined as the time in seconds which is required for 100 $cm^3$ of air to diffuse under defined conditions through one $inch^2$ of a sample. For the determination, a wad punch is used to punch out circular samples of diameter 44 mm. The sample to be examined is checked on a light stage for defects, possibly holes. Only visually impeccable samples are suitable for the measurement. Before commencement of the measurement, it should be checked that the level has been adjusted on the measuring instrument (Densometer model No. 4110N, Gurley Precision Instruments, Troy, N.Y.) and the external cylinder has been filled up to the mark with densometer oil from Gurley Precision Instruments. The densometer testing operation involves measuring the time needed for a particular amount of air to flow through a particular sample area under a uniform gentle pressure. The compressed air is produced by an internal cylinder of exact diameter and with standard weight and flows freely into an external cylinder partly filled with oil, which serves to ensure airtightness.

The composite body according to the invention preferably has a thickness of 100 to 400 μm, preferably 125 to 200 μm and more preferably of 130 to 170 μm. The thickness is determined with a micrometer from Mitutoyo (Digimetic Micrometer MDC-25PX, 0-25 μm).

The composite body according to the invention preferably has an average pore size of 60 to 140, preferably 75 to 130 nm. The average pore size is determined by means of gas flow porometry as described hereinafter with a Porolux 1000 (Porometer, Eke, Belgium).

For this purpose, a circular sample of diameter 25 mm is punched out of the material to be analysed, dried in a drying cabinet at 100° C. for 1 hour in order to remove moisture from the pores, and then placed immediately in the Porefil wetting fluid, in order that all pores present are filled with this liquid. Subsequently, the sample is degassed in a desiccator by briefly applying reduced pressure (150 mbar) in order to ensure that all pores are filled with Porefil. The degassed sample is placed into the sample holder of the measuring instrument and the sample holder is screwed together.

The determination of the pore radius distribution is based on the measurement principle of capillary flow porometry. The sample that has been wetted with the wetting liquid and degassed is subjected in the measurement cell to an inert gas pressure (nitrogen) that rises stepwise, and the pore diameter corresponding to the pressure applied is emptied by the gas pressure. At the same time, the flow rate of the gas at rising pressures is recorded. In the continuous pores, exchange of the wetting liquid with nitrogen takes place. This proceeds until the relevant pore range has been covered, i.e. until even the smallest pores present in the measurement region are freed of liquid. Subsequently, the pressure in the measurement cell is lowered again and the measurement is repeated on the now dry sample. The difference between the wet curve and the dry curve is used to calculate the pore size distribution. The porometry measurements lead to knowledge of the greatest pore radii present ("bubble point"), and of the most common and smallest pore diameters.

The composite body according to the invention has, on the surface of the layer (2), a surface roughness Sdq, determined as described hereinafter, of preferably less than 10 μm, more preferably of less than 8 μm.

Surface roughness is determined based on a measurement area of 2 cm*2 cm, measured by means of a confocal microscope (http://ak-rauheit.de/files/3D%20Kenngr%F6%DFen.pdf). The determination can be effected, for example, with a μsurf expert confocal microscope from Nanofocus, Oberhausen. This is done by using a lens of the 800xs type and taking a scan of 3×3 images. The evaluation is effected by using the μsoft analysis premium 7.4.8164 evaluation software with the unfiltered surface according to DIN ISO 25178. The Rdq values are ascertained according to DIN ISO 4287.

Preferred composite bodies according to the invention are those that have a Gurley number of 200 to 1700 sec, preferably 250 to 1200 sec and more preferably of 300 to 800 sec, a thickness of 100 to 400 µm, preferably 125 to 200 µm and more preferably of 130 to 170 µm, an average pore size (preferably of the outermost layer) of 60 to 140, preferably 75 to 130 nm, and/or, preferably and, a surface roughness Sdq of less than 10 µm, more preferably of less than 8 µm, particular preference being given to those composite bodies that have each of the most preferred parameters.

In the composite body according to the invention, the substrate is preferably a nonwoven fabric, knit or laid scrim, preferably a nonwoven fabric or laid scrim, more preferably a nonwoven fabric. The fibers preferably have a dimension of 1 to 200 g/km of fiber. The fibers are preferably made of polyacrylonitrile, polyamide, polyester and/or polyolefin, preferably of polyacrylonitrile. The fibers more preferably have a dimension of 10 to 80 g/km of fiber and the fibers most preferably have a dimension of 50 g/km of fiber and are made of polyacrylonitrile, polyamide, polyester and/or polyolefin, preferably of polyester, especially polyethylene terephthalate.

The substrate preferably has a thickness of 50 to 150 µm, preferably 100 to 130 µm. The substrate preferably has a basis weight of 40 to 150 g/m$^2$, preferably 50 to 120 g/m$^2$, preferably 50 to 100 g/m$^2$ and most preferably 60 g/m$^2$. The substrate more preferably has a thickness of 50 to 150 µm, preferably of 100 to 130 µm, and a basis weight of 40 to 150 g/m$^2$, preferably 50 to 120 g/m$^2$, preferably 50 to 100 g/m$^2$ and most preferably 60 g/m$^2$.

Particularly preferred substrates are those that have all the parameters mentioned, most preferably those that have each of the most preferred of the parameters mentioned.

It may be advantageous when, in the composite body according to the invention, a polymer layer (PS), which is preferably a gas separation layer, is present atop or above layer (2). Preferably, the polymer layer contains or preferably consists of one or more perfluorinated polymers, where polymers are also understood to mean copolymers. The polymer layer preferably consists of a perfluorinated polymer preferably having a ratio of fluorine atoms to carbon atoms of 2:1 to 1:2, preferably of 2:1 to 4:3. Perfluorinated polymers present may be any corresponding polymers. Preferably, amorphous perfluorinated polymers are present. A preferred perfluorinated polymer is poly[4,5-difluoro-2,2-bis(trifluoromethyl)-1,3-dioxole-co-tetrafluoroethylene] having 60 to 90 mol % of dioxole, preferably 87 mol % of dioxole, available from DuPont as TEFLON® AF 2400, poly[4,5-difluoro-2,2-bis(trifluoromethyl)-1,3-dioxole-co-tetrafluoroethylene] having 50 to 80 mol % of dioxole, preferably 65 mol % of dioxole, available from DuPont as TEFLON® AF 1600, a perfluorinated polymer from the CYTOP® series from AGC Chemicals Company, or amorphous poly(tetrafluoroethylene-co-2,2,4-trifluoro-5-trifluoromethoxy-1,3-dioxole), preferably having a proportion of ether functionalities of 30 to 90 mol %, preferably 40, 60 or 80 mol %, available, for example, from Solvay as HYFLON® AD 60 or HYFLON® AD 40H. The polymer layer (PS) preferably has a thickness of 0.05 µm to 10 µm, preferably of 0.1 µm to 1.5 µm, more preferably 0.1 to 1.0 µm.

It may additionally be advantageous when a further polymer coating (PB) which is formed by rubber-like polymers, preferably silicones, is present between layer (2) and the polymer layer (PS) and/or atop the polymer layer (PS). Especially suitable rubber-like polymers are those that have a high intrinsic gas permeability of >200 barrer (cm$^3$ under standard conditions/cm*sec*cmHg) for CO$_2$. Preferred rubber-like polymers are silicone polymers (silicones), for example polydimethylsilicone, polyethylmethylsilicone, nitrile silicone, rubbers, poly(4-methyl-1-pentene), polytrimethylsilylpropenes or else corresponding copolymers. The polymer coating (PB) preferably has a thickness of 0.05 µm to 10 µm, preferably of 3 µm to 8 µm, when it is a polymer coating present between layer (2) and the polymer layer, and preferably of 1 to 4 µm when it is a polymer coating (PB) present atop the polymer layer (PS).

The composite bodies of the invention are notable for good stability under handling. This reduces the probability of occurrence of faults/damage in the composite body that can occur, for example, during introduction into an apparatus for separation of gas mixtures. Typical faults/damage would be fractures in the ceramic owing to kinks or treatment with sharp objects.

The composite bodies according to the invention are preferably flexible. In the context of the present invention, "flexible" means that they can be wound without damage around a bar or around a tube having a diameter of down to 15 mm. Particularly preferred composite bodies according to the invention can be wound around a rod or around a bar having a minimal diameter of down to 5 mm without damage. Freedom of the corresponding composite bodies from damage can be demonstrated easily by the determination of the gas flow of nitrogen. In this context, an increase in gas flow determined with nitrogen by more than 100% is considered to be a fault in/damage to the composite body. By virtue of the flexibility of the composite bodies according to the invention, these are introducible in a very simple manner in typical module forms for flat membranes and are especially suitable for use in spiral-wound modules, plates or frame modules, pocket modules and other apparatuses that have been designed for flat membranes.

By virtue of the partially ceramic structure of the composite bodies according to the invention, these also have the advantage that there is preferably little change, preferably none at all, in their thickness and/or porosity under compressive stress. This has the advantage that the entire composite body, even under high compressive stress, permits a virtually constant flow performance in GPU, and the flow is not reduced at higher pressures by a compacting porous structure. To determine the changes in thickness and/or porosity, a circular sample having a diameter of 35 mm can be cut out of a composite body according to the invention and subjected to a pressure of up to 52 bar in a hydraulic press with simultaneous determination of thickness (measuring instrument from INSTRON). A diagram in which the thickness is plotted as a function of compression pressure can be used, after three cycles of compressive stress and relaxation, to calculate an elastic component of the change in thickness. For composite bodies according to the invention, this is preferably less than 8%, more preferably less than 7%.

The composite bodies according to the invention can be produced in different ways; preferably, the composite bodies according to the invention are obtained by the process according to the invention described hereinafter.

The process according to the invention for production of a composite body, preferably a composite body according to the invention, features the following steps:

(a) applying a coating composition (BM1) to and into a substrate having fibers and interstices between the fibers, where the coating composition is produced by combining (a1) a dispersion (D1) of oxide particles produced by mixing oxide particles selected from the oxides of the elements Ti, Al, Zr and/or Si, preferably selected from Al$_2$O$_3$, ZrO$_2$, TiO$_2$ and SiO$_2$, more preferably selected from the oxides of the elements Al and Si, and having a median particle diameter ($d_{50}$) of 0.5 to 4 μm with water, an inorganic acid, preferably nitric acid, and a dispersing aid, (a2) a dispersion (D2) of oxide particles produced by mixing oxide particles selected from the oxides of the elements Ti, Al, Zr and/or Si, preferably selected from the oxides of the elements Al and Si, and having a median particle diameter ($d_{50}$) of 15 to 150 nm, preferably 40 to 60 nm, with water, (a3) a binder formulation (BF1), produced by mixing at least two organofunctional silanes with an alkanol, preferably ethanol, an inorganic acid, preferably boric acid, and water, (b) consolidating the coating composition (BM1) at a temperature of 100° C. to 275° C., preferably 120 to 240° C., in order to create a first layer (S1'), (c) optionally applying a coating composition (BM2) to at least layer (S1'), where the coating composition (BM2) is produced by combining (c1) a dispersion (D3) of oxide particles produced by mixing oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 0.5 to 4 μm with water, an inorganic acid, preferably nitric acid, and a dispersing aid, (c2) a dispersion (D4) of oxide particles produced by mixing oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 15 to 150 nm, preferably 40 to 60 nm, with water, (c3) a binder formulation (BF2), produced by mixing at least two organofunctional silanes with an alkanol, preferably ethanol, an inorganic acid, preferably boric acid, and water, (d) optionally consolidating the coating composition (BM2) at a temperature of 100° C. to 275° C., preferably 120 to 240° C., in order to create a second layer (S2'), (e) applying a coating composition (BM3) to layer (S1') or, if present, layer (S2'), where the coating composition (BM3) has been produced by combining water and an inorganic acid with an (e1) aqueous dispersion (D5) including oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 25 to 100 nm, preferably 40 to 60 nm, and with ethanol and with a (e2) binder formulation (BF3) comprising at least two organofunctional silanes, (f) consolidating the coating composition at a temperature of 100° C. to 275° C., preferably 120 to 240° C., in order to create a layer (S3'), (g) optionally applying a coating composition (BM4) to layer (S3'), where the coating composition (BM4) has been produced by combining water and an inorganic acid with an (g1) aqueous dispersion (D6) including oxide particles selected from the oxides of the elements Ti, Al, Zr and/or Si, preferably selected from the oxides of the elements Al and Si, and having a median particle diameter of 15 to 150 nm, preferably 40 to 60 nm, and with ethanol and with a (g2) binder formulation (BF4) comprising at least two organofunctional silanes, (h) optionally consolidating the coating composition at a temperature of 100° C. to 275° C., preferably 120 to 240° C., in order to obtain a layer (S4').

Oxide particles used with very particular preference having a median particle diameter ($d_{50}$) of 15 to 150 nm, preferably 40 to 60 nm, are those based on $SiO_2$ or consisting thereof. Corresponding particles are available, for example, under the Aerosil® Ox50 name from Evonik Resource Efficiency GmbH.

In the production of the binder formulations BF1 to BF2, preference is given to using sufficient acid that the pH is from 2 to 5. In the production of the coating compositions BM1 to BM4, preference is given to using a sufficient amount of acid that the pH is from 2.5 to 5. If the binder formulation is produced using AMEO, the pH is preferably greater than 8, preferably 8.5 to 9.5. Especially in the case of use of AMEO in the binder formulation, it may be advantageous to combine individual component steps of the production of the binder formulation such that the feedstocks of the binder formulation are metered directly into the coating composition without intermediate steps. But this procedure is also employable for all other coating composition formulations.

Dispersing aids used may be any suitable dispersing aids. Preference is given to using dispersing aids that are sold under the DOLAPIX name by Zschimmer & Schwarz GmbH & Co KG or under the TEGO® Dispers name by Evonik Resource Efficiency GmbH. The dispersing aid used is more preferably a carboxylic acid formulation as sold, for example, under the DOLAPIX CE 64 name by Zschimmer & Schwarz GmbH & Co KG.

It may be advantageous and may therefore be preferable to conduct the optional steps (c) and (d) and (g) and (h) in the process according to the invention since it is possible in this manner to more easily and reliably obtain composite bodies that have a low surface roughness, preferably a surface roughness Sdq, of less than 10 μm, more preferably of less than 8 μm. Particular preference is therefore given to conducting both steps (c) and (d) and steps (g) and (h). In this way, it is also possible to ensure that defects in the composite body, i.e. sites where, for example, there is a distinct deviation in the average pore size, the Gurley number, the thickness and/or the surface roughness from the values claimed or those described as preferred, are avoided.

Organofunctional silanes, preferably alkoxy-functional silanes, more preferably methoxy- and/or ethoxy-functional silanes, that are used are preferably 3-glycidyloxytriethoxysilane, methyltriethoxysilane, octyltriethoxysilane, aminopropyltriethoxysilane and/or tetraethoxysilane. The organofunctional silanes used are preferably 3-glycidyloxytriethoxysilane, methyltriethoxysilane and tetraethoxysilane. In binder formulation (BF1) and/or (BF2), preferably and (BF2), 3-glycidyloxytriethoxysilane, methyltriethoxysilane and tetraethoxysilane are used in a mass ratio of 2 to 4:0.5 to 1.5:1, more preferably of 2.5 to 3.5:0.75 to 1.25:1, most preferably 3:1:1. In binder formulation (BF3) and/or (BF4), preferably and (BF4), 3-glycidyloxytriethoxysilane, methyltriethoxysilane and tetraethoxysilane are used in a mass ratio of 0.5 to 1.5:1.5 to 2.5:1, more preferably of 0.75 to 1.25:1.75 to 2.25:1, most preferably 1:2:1.

It may be advantageous when the coating compositions (BM3) and (BM4) are of identical composition. It may likewise be advantageous when the coating compositions (BM1) and (BM2) are of identical composition. In this way, it is possible to obtain layers (1) or (2) of uniform construction by producing layers (S1') and (S2') or (S3') and (S4'). This can also contribute to avoiding the number of defects in the composite body.

The substrate used in the process according to the invention is preferably a polymer nonwoven including fibers selected from polyacrylonitrile, polyester, polyamide and/or polyolefin, preferably from polyester, more preferably polyethylene terephthalate. Substrates used with preference preferably have the abovementioned parameters, especially the parameters mentioned there as preferred.

The coating compositions can be consolidated, for example, by passage through a hot air oven, an IR oven or another oven. The coating compositions BM1 to BM4 are preferably consolidated at a temperature of 100 to 275° C., more preferably at a temperature of 120 to 240° C.

It may be advantageous when, in a further step (i) conducted after step (f) or, if present, after step (h), a perfluorinated polymer, preferably a polymer layer containing or consisting of a perfluorinated polymer, is applied to layer (S3') or, if present, to layer (S4'). Preferably, the polymer layer contains or consists of an amorphous perfluorinated polymer, where polymers are also understood to mean copolymers. Preference is given to using perfluorinated polymers preferably having a ratio of fluorine atoms to carbon atoms of 2:1 to 1:2, preferably of 2:1 to 4:3. The perfluorinated polymers used may be any corresponding polymers. The preferred perfluorinated polymer used is poly[4,5-difluoro-2,2-bis(trifluoromethyl)-1,3-dioxole-co-tetrafluoroethylene] having 60 to 90 mol % of dioxole, preferably 87 mol % of dioxole, available from DuPont as TEFLON® AF 2400, poly[4,5-difluoro-2,2-bis(trifluoromethyl)-1,3-dioxole-co-tetrafluoroethylene] having 50 to 80 mol % of dioxole, preferably 65 mol % of dioxole, available from DuPont as TEFLON® AF 1600, a perfluorinated polymer from the CYTOP® series from AGC Chemicals Company, or amorphous poly(tetrafluoroethylene-co-2,2,4-trifluoro-5-trifluoromethoxy-1,3-dioxole), preferably having a proportion of ether functionalities of 30 to 90 mol %, preferably 40, 60 or 80 mol %, available, for example, from Solvay as HYFLON® AD 60 or HYFLON® AD 40H.

The polymer layer containing or consisting of a perfluorinated polymer can be applied by single or repeated application and consolidation of a corresponding polymer solution. Preference is given to applying a solution of the perfluorinated polymer to layer (S3') or, if present, preferably to layer (S4'). The applying can be effected, for example, by dipping (dip coating), print application, doctor blade application or spray application. The applying is preferably effected by dip coating. The proportion of the perfluorinated polymer in the solution is preferably 0.5% to 10% by weight, preferably 1.5% to 3.5% by weight, more preferably 2.5% by weight.

Solvents used may, for example, be fluorinated ethers or amines. The solvents used preferably have a boiling point of 25 to 250° C. Solvents used are preferably those solvents from the Cytop series, e.g. ct-100-solv or ct-180-solv from Asahi Glass Chem. (https://www.agc-chemicals.com/jp/en/fluorine/products/detail/index.html?pCode=JP-EN-F019), various Galden products, for example Galden D02TS or Galden HT55 from Solvay or else Novec products from 3M or similar solvents. The solvents used are preferably selected from Cytop ct 100 solv, Cytop ct 180 solv, Galden HT55, Novec 7300, most preferably Cytop ct 100 solv or Novec 7300.

The consolidation is preferably effected by drying at a temperature of 25 to 250° C., preferably of 50 to 225° C., and can be effected, for example, in an oven, hot air oven or infrared oven. The applying is preferably effected a sufficient number of times that a polymer layer having a thickness of 0.05 µm to 10 µm is obtained.

It may be advantageous when, before and/or after the applying of the polymer layer including a perfluorinated polymer, a coating containing or consisting of rubber-like polymers, preferably silicones, is applied. Especially suitable rubber-like polymers are those that have a high intrinsic gas permeability of >200 barrer ($cm^3$ under standard conditions/$cm*sec*cmHg$) for $CO_2$. Preferred rubber-like polymers are silicone polymers (silicones), for example polydimethylsilicone, polyethylmethylsilicone, nitrile silicone, rubbers, poly(4-methyl-1-pentene), polytrimethylsilylpropenes or else corresponding copolymers.

This polymer coating can be produced, for example, by applying a solution of the rubber-like polymer, preferably a silicone polymer, to layer (S3') or, if present, (S4') and/or to the polymer layer. The solution preferably includes 3% to 10% by weight of the polymer. Suitable solvents in the case of utilization of silicones are especially siloxane compounds, preferably hexamethyldisiloxane, but toluene or isooctane are also usable. If silicone is used as polymer, preference is given to utilizing multicomponent systems that can be sourced, for example, from Momentive, Panacol or Evonik Hanse Chemie GmbH. For example, it is possible to use the silicone RTV-615 from Momentive. Particular preference is given to applying one silicone coating before and one silicone coating after the applying of the polymer layer. It is preferable here when the silicone coating which is applied to layer (S3') or, if present, (S4') is produced by applying a silicone formulation containing 5% to 10% by weight, preferably 3% to 7% by weight, of silicone, preferably RTV-615 from Momentive, or an addition-crosslinking silicone formulation from Evonik Hanse Chemie GmbH, in hexamethyldisiloxane as solvent.

A typical formulation of addition-crosslinking silicones from Evonik Hanse Chemie GmbH, consists of solution A and solution B in variable composition, which may be combined in a ratio of 1:10 to 10:1 according to the requirements. Solution A here contains a platinum catalyst (platinum-siloxane complex) and may also contain variable proportions of vinyl-functional polydimethylsiloxane having the desired molecular weight and desired content of vinyl groups, vinyl-functional QM resin in the desired molecular weight and silica particles. Solution B contains SiH-containing polydimethylsiloxane (crosslinker) having the desired molecular weight and desired content of SiH groups, and 0.02% by weight of an inhibitor (e.g. alkynols, divinyltetramethyldisiloxane, methylvinylcyclotetrasiloxane), and may also contain variable proportions of vinyl-functional polydimethylsiloxane having the desired molecular weight and the desired content of vinyl groups, vinyl-functional QM resin in the desired molecular weight and silica particles.

The silicone formulation which is applied after the polymer coating may also be a moisture-crosslinking silicone system or one crosslinkable by irradiation, for example UV radiation, for example the RC silicone products from Evonik Resource Efficiency GmbH. Polymer formulations of good suitability preferably contain 3% to 7% by weight of crosslinkable silicone in solvents suitable for the respective silicone.

The drying of the coating containing or consisting of rubber-like polymers, preferably silicones, is effected preferably for 1 to 30 minutes at 50 to 150° C.

In the production of the solution of the rubber-like polymers, the polymers and the solution concentration, but also the time for mixing of the polymer components in the solvent, are preferably selected such that the mixture penetrates only slightly, and preferably not at all, into the pore structure of the composite body. This can be ascertained by the person skilled in the art by simple preliminary experiments.

It may be advantageous, prior to the respective applying of a polymer layer or rubber-like polymer coating, to treat the layer/structure to which the layer or coating is to be applied with a plasma, preferably a corona (air plasma). Preference is given here to setting a power of 50 to 900, preferably 100 to 300, W min/m$^2$, in the treatment of the coating including rubber-like polymers, preferably 300 to 900 W min/m$^2$ in the treatment of the ceramic layers (i.e. those containing oxide particles), preferably 200 to 400 W min/m$^2$ in the treatment of the layers including perfluorinated polymers. Suitable equipment for corona treatment is available from Softal, Hamburg.

The process for producing the composite bodies according to the invention can be conducted continuously or batchwise. The process is preferably conducted as a roll-to-roll process. Preference is given to conducting all steps (a) to (i) and if appropriate the corresponding sub-steps in such a way that the substrate or the substrate that has been coated once or more than once is unwound from a roll and guided through an apparatus in which one or more steps or sub-steps are conducted and, after the consolidation of the layer(s) applied, the substrate that has been coated once or more than once or the composite body of the invention is rolled up. It may be advantageous when, in the rolling-up of the composite body, an interlayer that prevents sticking of or damage to the layer (S1') or (S4') or any polymer layer present is included in the roll. Polyethylene terephthalate nonwovens, for example, are suitable as interlayer, for example those as also used as substrate. If the process according to the invention is conducted as a roll-to-roll method, the web speed is preferably from 1 to 500 mm/sec., preferably 20 to 50 mm/sec.

By means of the process according to the invention, it is possible to obtain the composite bodies according to the invention. Accordingly, the present invention likewise provides gas separation apparatuses comprising a composite body according to the invention or composite bodies produced in accordance with the invention.

The composite bodies according to the invention and/or the composite bodies produced in accordance with the invention, especially those having a layer containing or consisting of perfluorinated polymers can be used as gas separation membrane, more preferably for separation of methane from $CO_2$. Preferred composite bodies according to the invention usable as gas separation membrane have gas flows of >50 GPU, preferably of >80 GPU and less than 200 GPU for carbon dioxide as clean gas.

The composite bodies according to the invention can preferably be used in apparatuses for gas separation since they combine relatively high clean gas selectivities with a high flow rate for carbon dioxide. This makes use in plants for separation of corresponding mixtures efficient, and hence it improves the economic viability of the corresponding separation processes.

The gas separation membranes according to the invention may also be suitable for separation of further gas mixtures. More preferably, the composite materials according to the invention are used for separation of methane from $CO_2$, $H_2$ from $CO_2$, $H_2$ from $N_2$, $O_2$ from $N_2$ or He from $CH_4$, more preferably for separation of $CH_4$ from $CO_2$. Table A below states the clean gas selectivities that can be achieved for the respective gas mixtures according to the perfluorinated polymer from which the layer containing or consisting of perfluorinated polymers has been formed.

TABLE A

Clean gas selectivities achievable with gas separation membranes according to the invention

| Gas components | | Clean gas selectivity for Hyflon AD 60 | Clean gas selectivity for Cytop |
|---|---|---|---|
| Gas 1 | Gas 2 | Gas1/Gas2 | Gas1/Gas2 |
| $CO_2$ | $CH_4$ | 13 | 18 |
| $CO_2$ | $N_2$ | 6.5 | 3 |
| $H_2$ | $CO_2$ | 18 | 1.7 |
| $H_2$ | $N_2$ | 9 | 12 |
| $O_2$ | $N_2$ | 3 | 3 |
| He | $CH_4$ | 39 | 84 |

The present invention is described by way of example by the images of a composite body according to the invention that are shown in the figures FIG. 1 and FIG. 2, without being limited thereto.

The present invention is described by the examples which follow, without being limited thereto.

EXAMPLES

TABLE 1a

Raw materials used

| Raw material | If appropriate branding, manufacturer (abbreviations used in brackets thereafter) |
|---|---|
| Ethanol | |
| Demineralized water | |
| Dispersant | DOLAPIX ® CE 64, Zschimmer & Schwarz GmbH & Co. KG (CE 64) |
| Boric acid | |
| Nitric acid (65% strength by weight) | ($HNO_3$) |

TABLE 1a-continued

Raw materials used

| Raw material | If appropriate branding, manufacturer (abbreviations used in brackets thereafter) |
|---|---|
| 3-Glycidyloxytrimethoxysilane | DYNASYLAN ® GLYMO, Evonik Resource Efficiency GmbH (GLYMO) |
| 3-Glycidyloxytriethoxysilane | DYNASYLAN ® GLYEO, Evonik Resource Efficiency GmbH (GLYEO) |
| Methyltriethoxysilane | DYNASYLAN ® MTES, Evonik Resource Efficiency GmbH (MTES) |
| Tetraethoxysilane | DYNASYLAN ® TEOS, Evonik Resource Efficiency GmbH (TEOS) |
| Aluminium oxide | CT1200 SG, Almatis GmbH |
| Aluminium oxide | CT 3000 SG, Almatis GmbH |
| Silicon dioxide | AEROSIL ® Ox 50, Evonik Resource Efficiency GmbH (Ox50) |
| Silicon dioxide | AEROSIL ® 90, Evonik Resource Efficiency GmbH |
| Silicon dioxide | AEROSIL ® 200, Evonik Resource Efficiency GmbH |
| Titanium dioxide | AEROXIDE ® TiO2 P 25, Evonik Resource Efficiency GmbH (P25) |
| Zirconium oxide | 50 nm zirconium oxide, Sigma Aldrich |
| Silica sol | LEVASIL ® CS40-316P, Obermeier GmbH |
| Aluminium oxide | MARTOXID ® MZS-1, Martinswerk GmbH (MZS-1) |
| Aluminium oxide | MARTOXID ® MZS-3, Martinswerk GmbH (MZS-3) |
| Aluminium oxide | AEROXIDE ® Alu C, Evonik Resource Efficiency GmbH (Alu C) |
| Perfluorinated polymer | Cytop-ctl 109 AE, Asahi Glass Chem. |
| Perfluorinated polymer | Cytop-ctl 107 MK, Asahi Glass Chem. |
| Perfluorinated polymer | Hyflon AD60, Solvay |
| Solvent | Ct-100-solv, Asahi Glass Chem. |
| Solvent | Novec 7300, 3M |
| Solvent | Galden HT55, Solvay |
| 2-component polymer silicone | RTV-615 (A + B), Momentive |

TABLE 1b

Substrate materials used:

| Substrate | Design | Material | Basis weight | Supplier |
|---|---|---|---|---|
| 1 | 05-TH-60W nonwoven fabric | PET | 60 g/sqm | Sojitz, Düsseldorf |
| 2 | Nonwoven fabric | Carbon | 15 g/sqm | Technical Fiber Products, Burnside Mills |
| 3 | Weave | E glass | 60 g/sqm | P&G |
| 4 | Monofilament weave | PET | 40 g/sqm | SEFAR |

Example 1: Production of a Composite Material According to the Invention

Example 1a: Production of Binder Formulation I

A 250 ml beaker was initially charged with 14.22 g of ethanol together with 2.84 g of boric acid, and they were stirred with one another with a magnetic stirrer. As soon as the boric acid had largely dissolved, it was possible to successively add 18.16 g of GLYEO (corresponding to 15.5 g of GLYMO), 5.14 g of TEOS and 5.14 g of MTES. (For varying experimental conditions, this part had to be varied in each case.) After this was in well-mixed form, an amount of 0.03 g of water was added to start the hydrolysis. The mixture was stirred on a magnetic stirrer for 15 h before a second water content of 7.1 g was added while stirring. The silane binder formulation thus prepared was stirred for a further 5 h until the "pre-hydrolysis" had abated before it was used.

Example 1b: Production of Particle Formulation I 11 kg of water were introduced into a hobbock. 5 kg of Ox50 were added while pivoting. This mixture was stirred slowly for 1 h. In order to further reduce the size of the particles, the mixture was guided through a UIP 1000 ultrasound flow cell in an amount of 12 l/h for a duration of 6 hours. The particle size $d_{50}$ was determined as specified in the description as <60 nm. The solids content was about 30% by mass.

Example 1c: Production of Coating Composition I

A 1000 ml beaker was charged successively with 97 g of water, 0.44 g of Dolapix CE64 and 1.84 g of a 65% strength by mass nitric acid solution, and they were mixed with one another with a magnetic stirrer. 200 g of a finely divided alumina (ct1200SG) were added in portions to this mixture with constant stirring.

Once all components had been weighed in and were in well-mixed form, this dispersion was treated with an ultrasound dispersing finger (Hielscher UP200) in order to destroy any agglomerates present. 42 g of ethanol were added to this dispersion, then this mixture was stirred at least for a further 15 h. After the 15 h had elapsed, either 13.5 g of a 30% OX50 dispersion, prepared according to example 1b, and 8.74 g of water or 4 g of Aerosil Ox50 together with 18 g of water were added. Subsequently, 52.6 g of a prepared silane binder formulation were added and the overall dispersion was aged again at rest for at least 15 h.

The resulting coating composition has a solids content of 58.7% and can be utilized in this form for coating experiments.

Example 1d: Production of Binder Formulation II

A 250 ml beaker was initially charged with 10.45 g of ethanol together with 0.84 g of boric acid, and they were stirred with one another with a magnetic stirrer. As soon as the boric acid had largely dissolved, it was possible to successively add 5.89 g of GLYEO, 5.0 g of TEOS and 10 g of MTES. (For varying experimental conditions, this part had to be varied in each case.) After this was in well-mixed form, an amount of 0.03 g of water was added to start the hydrolysis. The mixture was stirred on a magnetic stirrer for 1 h before a further 5.19 g of demineralized water were added while stirring. The silane binder formulation II thus prepared was stirred for a further 15 h before it was used.

Example 1e: Production of Coating Composition II

A 1000 ml beaker was initially charged with 101.35 g of the Ox50 dispersion from example 1b and then 299.88 g of demineralized water and 3 g of a 65% strength by mass nitric acid solution were added successively, and the mixture was stirred with a magnetic stirrer for 15 hours.

37.39 g of the prepared (silane) binder formulation II and 150.4 g of ethanol were added to this dispersion. Subsequently, this mixture was stirred for a further 2 days.

The resulting coating composition II has a solids content of Ox50 of about 5.7% and can be utilized in this form for the coating experiments.

Example 1f: Coating Process

A strip of the material to be coated (weave, nonwoven fabric or knit) having width 10 cm and length about 1 m was prepared. Alternatively, it is also possible to use the result of a coating operation as described here. In this case, however, it should be ensured that preferably always the same side is processed in subsequent treatment steps.

An automated film drawing apparatus from Zehntner was modified such that it uses a pulley mechanism to pull the web material to be coated vertically upward, at a defined speed of 42 mm/s, out of a dip coating apparatus in which one side of the material web is deflected via a roll and hence does not come into contact with the coating dispersion and the other side of the material web is conveyed through a tank filled with the dispersion.

For coating, the ready-mixed dispersion (coating composition I or II) is introduced into a tank in which there is a rotating roll spanned by the material web. The fill level of the tank was adjusted such that only 45° of the circumference of the roll dips into the solution. For good guiding of the material web, and in order to prevent the dispersion from running along the material web, the web tension was more than 0.1 N/cm of material web width. The material web is guided through the dispersion at a speed of 42 mm/s at room temperature and standard pressure.

On conclusion of the coating, the material web remained suspended vertically at a well-ventilated site for another 30 minutes and only thereafter was it dried and consolidated in a drying cabinet, lying on a grid, at 120° C. for one hour.

Either the dried material web is coated again or the finished composite body can subsequently be cut to size by cutting or punching for the respective test or uses.

For production of the composite material of the invention, coating was effected twice in succession with a coating composition I and twice with a coating composition II. The coating compositions I and II used in any example could be the same or different. To ascertain the most suitable feedstocks (substrate, coating composition, particle formulation, binder formulation etc.), in preliminary experiments, coating was effected as appropriate also only once or more than once with the coating composition I only. The corresponding tables each state the number of coating operations.

The experiments according to Example 1 were conducted analogously using different particle formulations, different coating compositions I and II, different binder mixtures I and II, and different process parameters. Tables 2a to 2l show the raw materials and amounts used, and the process parameters used in each case.

TABLE 2a

Raw materials and amounts used for the production of the binder formulation I (BF-I) and varied process parameters

| BF-I | Ethanol [g] | Boric acid [g] | MTES [g] | TEOS [g] | GLYEO [g] | Water [g] | Total [g] |
|---|---|---|---|---|---|---|---|
| BF-I-a | 14.22 | 2.84 | 5.14 | 5.14 | 18.16 | 0.03 7.1 | 52.6 |
| BF-I-b | 14.22 | 2.84 | 10.28 | 5.14 | 6.01 | 0.03 7.1 | 45.6 |

TABLE 2b

Raw materials and amounts used for the production of the particle formulations (PF) in the respective examples

| PF | Particle type | Water [g] | Dolapix CE64 [g] | HNO3 (65%) [g] | Particles [g] | Ethanol [g] | PF-0 [g] | Water [g] | Total [g] |
|---|---|---|---|---|---|---|---|---|---|
| PF-0 | Ox 50 | 11 000 | | | 5000 | | | | 16 000 |
| PF-I-a | CT 1200 SG | 96.8 | 0.44 | 1.84 | 200 | 41.4 | 13.62 | 8.74 | 362.8 |
| PF-I-b | CT 3000 SG | 96.8 | 0.44 | 1.84 | 200 | 41.4 | 13.62 | 8.74 | 362.8 |
| PF-I-c | MZS-1 | 193.6 | 0.88 | 3.68 | 400 | 82.8 | 27.24 | 17.48 | 725.6 |
| PF-I-d | MZS-3 | 193.6 | 0.88 | 3.68 | 400 | 82.8 | 27.24 | 17.48 | 725.6 |
| PF-I-e | MZS-1 MZS-3 | 193.6 | 0.88 | 3.68 | 200 200 | 82.8 | 27.24 | 17.48 | 725.6 |

TABLE 2c

Raw materials and amounts used for the production of coating composition I (BM-I) in the respective examples

| BM-I | PF-I | Weight of PF-I [g] | BF-I | Weight of BF-I [g] |
|---|---|---|---|---|
| BM-I-a | PF-I-a | 362.8 | BF-I-a | 52.6 |
| BM-I-b | PF-I-a | 362.8 | BF-I-b | 45.6 |
| BM-I-c | PF-I-b | 362.8 | BF-I-a | 52.9 |
| BM-I-d | PF-I-c | 725.6 | BF-I-a | 105.3 |
| BM-I-e | PF-I-d | 725.6 | BF-I-a | 105.3 |
| BM-I-f | PF-I-e | 725.6 | BF-I-a | 105.3 |

TABLE 2d

Raw materials and amounts used for the production of the particle formulations II (PF-II) in the respective examples

| PF-II | Particle type | Water [g] | PF-0 [g] | HNO3 (65%) [g] | Particles [g] | Total [g] |
|---|---|---|---|---|---|---|
| PF-0 | Ox 50 | 11 000 | | | 5 000 | 16 000 |
| PF-II-a | Ox 50 | 299.9 | 101.4 | 3 | | 403 |
| PF-II-b | Alu C | 371.2 | | 3 | 30 | 404 |
| PF-II-c | Aerosil 90 | 371.2 | | 3 | 30 | 404 |
| PF-II-d | Aerosil 200 | 371.2 | | 3 | 30 | 404 |
| PF-II-e | P25 | 371.2 | | 3 | 30 | 404 |
| PF-II-f | Zirconium oxide | 371.2 | | 3 | 30 | 404 |
| PF-II-g | Levasil 30 | 301.2 | | 3 | 100 | 404 |

TABLE 2e

Raw materials and amounts and optionally varied parameters used for the production of binder formulation (BF-II) in the respective examples

| BF-II | Ethanol [g] | Boric acid [g] | MTES [g] | TEOS [g] | GLYEO [g] | Water [g] | Total [g] |
|---|---|---|---|---|---|---|---|
| BF-II-a | 10.45 | 0.84 | 10 | 5 | 5.89 | 5.22 | 37.4 |
| BF-II-b | 2.75 | 0.22 | 1 | 1 | 3.5 | 1.37 | 9.8 |
| BF-II-c | 5.5 | 0.44 | 2 | 2 | 7 | 2.74 | 16.7 |
| BF-II-d | 14.22 | 2.84 | 5.14 | 5.14 | 18.16 | 7.1 | 52.6 |
| BF-II-e | 11 | 0.88 | 4 | 4 | 14 | 5.48 | 39.4 |
| BF-II-f | 8.25 | 0.66 | 3 | 3 | 10.5 | 4.11 | 29.5 |
| BF-II-g | 16.5 | 1.32 | 6 | 6 | 21.1 | 8.22 | 59.1 |
| BF-II-h | 21.98 | 1.76 | 8 | 8 | 28.1 | 10.95 | 78.8 |
| BF-II-i | 10.3 | 0.83 | 8 | 8 | 4.7 | 5.13 | 37.0 |
| BF-II-k | 10.6 | 0.85 | 6.7 | 6.7 | 7.8 | 5.3 | 37.9 |
| BF-II-l | 10.8 | 0.87 | 5 | 5 | 11.7 | 5.4 | 38.8 |
| BF-II-m | 11.0 | 0.89 | 3.3 | 3.3 | 15.6 | 5.5 | 39.6 |
| BF-II-n | 10.4 | 0.84 | 10 | 5 | 5.9 | 5.2 | 37.3 |
| BF-II-o | 10.0 | 0.8 | 6.7 | 6.7 | 6.7 (AMEO) | 5.0 | 35.8 |
| BF-II-p | 10 | 0.8 | 5 (AMEO) | 5 | 10 (IBTEO) | 5.0 | 35.8 |
| BF-II-q | 10 | 0.8 | 12 | 4 | 4.7 | 5.1 | 37.0 |

TABLE 2f

Raw materials and amounts used for the production of coating composition II (BM-II) or coating composition III (BM-III) in the respective examples

| BM-II | PF-II | Weight of PF-II [g] | BF-II | Weight of BF-II [g] | Weight of ethanol [g] |
|---|---|---|---|---|---|
| BM-II-a | PF-II-a | 404 | BF-II-a | 37.4 | 150 |
| BM-II-b | PF-II-a | 404 | BF-II-b | 9.8 | 150 |
| BM-II-c | PF-II-a | 404 | BF-II-c | 16.7 | 150 |
| BM-II-d | PF-II-a | 404 | BF-II-n | 37.3 | 150 |
| BM-II-e | PF-II-a | 404 | BF-II-e | 39.4 | 150 |
| BM-II-f | PF-II-a | 404 | BF-II-f | 29.5 | 150 |
| BM-II-g | PF-II-a | 404 | BF-II-g | 59.1 | 150 |
| BM-II-h | PF-II-a | 404 | BF-II-h | 78.8 | 150 |
| BM-II-i | PF-II-e | 404 | BF-II-e | 39.4 | 150 |
| BM-II-k | PF-II-f | 404 | BF-II-e | 39.4 | 150 |
| BM-II-l | PF-II-g | 404 | BF-II-e | 39.4 | 150 |
| BM-II-m | PF-II-a | 404 | BF-II-i | 39.4 | 150 |
| BM-II-n | PF-II-a | 404 | BF-II-k | 37.9 | 150 |
| BM-II-o | PF-II-a | 404 | BF-II-l | 38.8 | 150 |
| BM-II-p | PF-II-a | 404 | BF-II-m | 39.6 | 150 |
| BM-II-q | PF-II-b | 404 | BF-II-n | 37.3 | 150 |
| BM-II-r | PF-II-a | 404 | BF-II-i | 37.0 | 150 |
| BM-II-s | PF-II-a | 404 | BF-II-k | 37.9 | 150 |
| BM-II-t | PF-II-b | 404 | BF-II-e | 39.4 | 150 |
| BM-II-u | PF-II-c | 404 | BF-II-e | 39.4 | 150 |
| BM-II-v | PF-II-d | 404 | BF-II-e | 39.4 | 150 |
| BM-II-w | PF-II-a | 404 | BF-II-q | 37.0 | 150 |
| BM-II-x | PF-II-a | 404 | BF-II-n | 37.3 | 150 |
| BM-III-a | PF-II-a | 404 | BF-II-o | 35.0 | 150 |
| BM-III-b | PF-II-a | 404 | BF-II-p | 35.0 | 150 |

TABLE 2g

Experiments to test the suitability of substrates

| Composite body | Substrate | BM | Application operations |
|---|---|---|---|
| A | 1 | BM-I-a | 2 |
| B | 2 | BM-I-a | 2 |
| C | 3 | BM-I-a | 2 |
| D | 4 | BM-I-a | 2 |

TABLE 2h

Experiments to test the suitability of coating compositions I

| Composite body | Support | BM | Application operations |
|---|---|---|---|
| E | 1 | BM-I-a | 2 |
| F | 1 | BM-I-b | 2 |
| G | 1 | BM-I-c | 2 |
| H | 1 | BM-I-d | 2 |
| I | 1 | BM-I-e | 2 |
| J | 1 | BM-I-f | 2 |

TABLE 2i

Experiments to fix the ratio of binder to particles in coating composition II

| Composite body | Support | BM | Application operations |
|---|---|---|---|
| K | Composite body A | BM-II-b | 2 |
| L | Composite body A | BM-II-c | 2 |
| N | Composite body A | BM-II-e | 2 |
| O | Composite body A | BM-II-f | 2 |
| P | Composite body A | BM-II-g | 2 |
| Q | Composite body A | BM-II-h | 2 |

TABLE 2j

Experiments to fix the particles to be used in coating composition II

| Composite body | Support | BM | Application operations |
|---|---|---|---|
| R | Composite body A | BM-II-e | 2 |
| S | Composite body A | BM-II-t | 2 |
| T | Composite body A | BM-II-u | 2 |
| U | Composite body A | BM-II-v | 2 |
| V | Composite body A | BM-II-i | 2 |
| W | Composite body A | BM-II-k | 2 |
| X | Composite body A | BM-II-l | 2 |

TABLE 2k

Experiments to fix the binder formulation to be used in coating composition II

| Composite body | Support | BM | Application operations |
|---|---|---|---|
| 2A | Composite body A | BM-II-e | 2 |
| 2B | Composite body A | BM-II-m | 2 |
| 2C | Composite body A | BM-II-n | 2 |
| 2D | Composite body A | BM-II-o | 2 |
| 2E | Composite body A | BM-II-p | 2 |
| 2F | Composite body A | BM-II-q | 2 |
| 2G | Composite body A | BM-II-w | 2 |
| 2H | Composite body A | BM-II-x | 2 |

TABLE 2l

Experiments to fix the binder formulation to be used in coating composition II (one-pot method)

| Composite body | Support | BM | Application operations |
|---|---|---|---|
| 2I | Composite body A | BM-III-a | 2 |
| 2K | Composite body A | BM-III-b | 2 |

Example 2: Characterization of the Composite Bodies

The composite bodies produced in the examples were characterized as described hereinafter. The results are compiled in Table 3.

The roughnesses Rdq min., Rdq max. and SDQ were determined as described in detail above.

Composite Bodies A to D:

All samples have individual regions that show low roughness (Rdq min). However, it was possible to infer from the images taken that the monofilament weave regularly has heights and depths for structure-related reasons. Therefore, this material is excluded from further assessment.

To achieve surfaces of maximum smoothness, the first ceramic layer must already be very substantially homogeneous. Substrate materials such as "monofilament weave" therefore do not appear to be very suitable.

Glass fiber weaves would be of very good suitability, but these tend to cracking in the ceramic layer because the filaments (interstices between the individual fibers) are poorly impregnated.

"Wet-laid" nonwovens and also papers feature quite smooth structures (without protruding fibers) and are therefore of good suitability as support. However, when thick individual fibers are used, close attention should be paid to the interstices between the fibers, since these must be very substantially filled (closed). Spunbonded nonwovens and meltblown nonwovens are of poor suitability, as are "dry-laid" needlefelt nonwovens. Particularly suitable substrates are therefore PET nonwoven and carbon fiber nonwoven.

Moreover, it is necessary to choose a multilayer construction since an individual coating on its own does not give a sufficiently smooth surface. The first layer serves in particular to fill the fiber interstices. Thereafter, the layers must become smoother; a simultaneous aim is a reduction in the pore radii by use of smaller particles.

Composite Bodies E to J:

A double coating with the various particles shows that ct1200SG and MZS1 have the best suitability. In the case of these, the fiber interstices have the best filling, which results in a relatively even surface. Finer and also larger particles lead to poorer filling of the fiber interstices (ct 3000 SG or MZS3).

A mixture of MZS1 and MZS3 also gives relatively good surface qualities, but combined with a larger average pore radius. Since a material having pores of size less than 100 nm is to be provided as the resulting membrane surface, further work thereafter was conducted with ct1200SG in particular (although MZS1 would be just as suitable).

Composite Bodies K to Q:

On application of further layers of fine Ox50 particles to the ct1200SG surface, the average pore size is reduced and the surface quality is improved; variations in the composition of particle content relative to silane binder content were conducted.

Very small binder contents lead to a more uneven surface than higher binder contents. But an increase to twice the content again leads to a deterioration in the Sdq value. The optimum is at a mixing ratio of Aerosil OX50/silane binder of 50:50 (g/g) up to 65:35 (g/g).

Composite Bodies R to X:

On comparison of the various particles used, it is firstly noticeable that silane binders with silicon dioxide particles result in quite good smooth surfaces. Owing to the particle structure, however, Aerosil 90 and Aerosil 200 (aggregated primary particles) are not very suitable, just like the aluminium oxide Alu C. Ox-50, being matched to the pores of the substructures to be coated, has the most suitable particles (particle size).

Titanium dioxide P25 is stabilizable only to a limited degree with the binder system under the conditions chosen, and therefore forms very poor surfaces. Zirconium oxide (from Roth) is virtually just as suitable as Ox50. Levasil has very small, very well-stabilized $SiO_2$ particles, but these are so small that they are sucked into the pores of the substructure (ct 1200SG). Therefore, there is barely any difference in the surface quality of this sample from that of the non-aftercoated ct1200SG surface.

Composite Bodies 2A to 2H:

It was found that both hydrophilized silane mixtures (higher proportion of TEOS and GLYEO) and hydrophobized silane mixtures (higher proportion of MTES) result in smooth coatings. Only the samples that were produced with an elevated content of the crosslinking TEOS component (TEOS content>25%) showed poorer surface qualities.

The results seem to be essentially independent of the particle system chosen, meaning that the trends (not the absolute results) in the respective particle system are the same.

Contact angle not measurable (nm) appears in Table 3 when the surface is so hydrophilic that a water droplet is sucked in.

Composite bodies 2I and 2K:

The production of mixtures with aminosilanes is not possible in the form described. In order to be able to prepare the samples, the silane mixture has to be introduced without pre-hydrolysis into the vessel in which the particle dispersion is already being stirred and hydrolysed therein (one-pot method). Otherwise, the pre-hydrolysate would solidify (gelation).

Exchange of the adhesion-promoting component GLYEO for AMEO is possible in principle. More particularly, it is readily possible in this way (and by virtue of the altered pH established) to use other particle systems, for example P25.

Various alkylsilanes (IBTEO), by contrast with MTES, lead to an enhanced tendency to form agglomerate. This then leads to very uneven surfaces.

TABLE 3

Results of the characterization of the composite bodies produced in the examples and in the comparative example

| Composite body | Rdq min. | Rdq max. | SDQ | Contact angle | Basis weight | Thickness | Tensile strength, machine direction | Tensile direction, cross | MFP | Gurley number |
|---|---|---|---|---|---|---|---|---|---|---|
| A | 5.5 | 52.5 | 18.9 | 88 | 215 | 118 | >50 | 37 | 0.27 | 340 |
| B | 7.1 | 42.4 | 34.7 | 73 | 163 | 120 | 49.1 | 20 | 0.31 | 110 |
| C | 5.1 | 9.0 | 10.5 | 80 | 211 | 125 | >50 | >50 | — | 290 |
| D | 7.2 | 17.2 | 18.0 | 82 | 307 | 256 | >50 | 40 | 0.38 | 580 |
| E | 7.8 | 58.6 | 21 | 125 | 230 | 157 | >50 | 40 | 0.32 | 190 |
| F | 3.9 | 66.0 | 45.2 | 54 | 279 | 172 | >50 | 43 | 3.7 | 1100 |
| G | 6.6 | 10.8 | 12.9 | 84 | 238 | 141 | 47 | 36 | 0.38 | 340 |
| H | 12.4 | 32.4 | 28.2 | 7 | 254 | 225 | 48 | 36 | 0.77 | 110 |
| I | 9.6 | 16.8 | 18.4 | — | 285 | 174 | 49 | 34 | 0.45 | 250 |
| J | 3.5 | 8.7 | 8.0 | — | 208 | 146 | 47 | 43 | 0.18 | 1010 |
| K | 3.6 | 6.9 | 7.8 | — | 218 | 142 | 43 | 43 | 0.11 | 900 |
| L | 5.2 | 9.5 | 11.0 | 8.17 | 245 | 138 | >50 | 37 | 0.11 | 500 |
| N | 5.4 | 16.0 | 11.0 | 8.02 | 206 | 147 | >50 | 36 | 0.11 | 550 |
| O | 4.2 | 9.8 | 8.4 | 75.74 | 206 | 139 | >50 | 38 | 0.12 | 440 |
| P | 3.3 | 5.4 | 6.5 | — | 205 | 135 | >50 | 40 | 0.12 | 550 |
| Q | 3.7 | 15.0 | 9.7 | 40.1 | 209 | 142 | >50 | 33 | 0.13 | 720 |
| R | 3.4 | 8.5 | 7.5 | — | 209 | 144 | >50 | 30 | 0.11 | 740 |
| S | 12.0 | 52.0 | 40.0 | 35.55 | 211 | 148 | >50 | 39 | 0.26 | 400 |
| T | 13.0 | 59.0 | 57.0 | 26.21 | 209 | 147 | >50 | 32 | 0.26 | 470 |
| U | 5.3 | 21.0 | 15.0 | 15.43 | 209 | 141 | >50 | 37 | 0.22 | 520 |
| V | 67.0 | 79.0 | 82.0 | — | 210 | 154 | >50 | 33 | 0.30 | 640 |
| W | 5.7 | 15.0 | 13.0 | 11.48 | 208 | 140 | >50 | 26 | 0.12 | 540 |
| X | 5.8 | 45.0 | 16.0 | 20.35 | 206 | 136 | >50 | 38 | 0.29 | 1600 |
| 2A | 3.4 | 8.5 | 7.5 | — | 209 | 144 | >50 | 30 | 0.11 | 740 |

TABLE 3-continued

Results of the characterization of the composite bodies
produced in the examples and in the comparative example

| Composite body | Rdq min. | Rdq max. | SDQ | Contact angle | Basis weight | Thickness | Tensile strength, machine direction | Tensile direction, cross | MFP | Gurley number |
|---|---|---|---|---|---|---|---|---|---|---|
| 2G | 5.6 | 22.0 | 14.0 | 74.7 | 209 | 153 | 50 | 46 | 0.14 | 560 |
| 2H | 5.2 | 9.5 | 11.0 | 79.99 | 243 | 138 | 48 | 30 | 0.12 | 440 |
| 2B | 6.1 | 31. | 18.0 | 52.09 | 223 | 167 | >50 | 42 | 0.10 | 750 |
| 2C | 6.6 | 12.0 | 17.0 | — | 227 | 170 | >50 | 31 | 0.20 | 750 |
| 2D | 4.5 | 12.0 | 12.0 | — | 251 | 146 | 49 | 34 | 0.12 | 710 |
| 2H | 4.5 | 12.0 | 13.0 | 63.44 | 196 | 128 | >50 | 28 | 0.087 | 710 |
| 2E | 3.7 | 15.0 | 11.0 | — | 242 | 141 | >50 | 31 | 0.12 | 610 |
| 2F | 12.0 | 52.0 | 40.0 | 120.13 | 249 | 155 | >50 | 36 | 0.26 | 460 |
| 2I | 5.4 | 8.4 | 7.8 | 43.17 | 206 | 145 | 49 | 40 | 0.11 | 470 |
| 2K | 6.0 | 13.9 | 10.7 | 106.8 | 209 | 148 | >50 | 32 | 0.10 | 550 |

— = not measurable

Example 3: Continuous Process for Producing a Composite Body

To produce a composite body according to the invention (analogously to A) in a continuous coating process in a corresponding manufacturing system as manufactured, for example, by Matthis, consisting of a support unwinder, a coating unit, a dryer and a winder with tension control, coating composition BM-I-a was produced in a batch size 125 times greater in a stirred 70l stainless steel vessel as described above. This was then coated by the dip-coating method with retention of a tension of >1 N/cm of material web width on a polyester nonwoven support (05-TH-60W nonwoven fabric) having a width of about 30 cm and length up to 500 metres, in the course of which the support was also impregnated. This was introduced into an air circulation oven of length 5 m about 50 cm downstream of the dip-coater, in which the composite material was dried at 140° C. The material web speed was 1.5 m/min.

After the material web had been dried, it was wound up at the given tension and then treated for a second time in another coating operation with retention of all process parameters. The resulting composite body K-VK-1 (analogously to composite body A) is described by the parameters specified in Table 4.

a) Hydrophilic Composite Body

This composite body K-VK-1 was subsequently coated twice with a coating composition BM-II-e produced on a scale enlarged by about 10-fold in the same system operated with the same machine parameters. The resulting continuously produced composite body K-VK-2 (analogously to composite body R) is described by the parameters specified in Table 4.

b) Hydrophobic Composite Body

Composite body K-VK-1 was subsequently coated twice with a coating composition BM-II-x produced on a scale enlarged by about 10-fold in the same system operated with the same machine parameters. The resulting continuously produced composite body K-VK-3 (analogously to composite body 2H) is described by the parameters specified in Table 4.

TABLE 4

Parameters for the test specimens produced in Example 3

| Composite body | Rdq min. | Rdq max. | SDQ | Contact angle | Basis weight | Thickness | Tensile strength Machine direction | Tensile strength Cross | MFP [µm] | Gurley number |
|---|---|---|---|---|---|---|---|---|---|---|
| K-VK-1 | 6.7 | 19.3 | 14.3 | 85 | 185 | 138 | >50 | 34 | 0.25 | 350 |
| K-VK-2 | 4.5 | 13.5 | 11.6 | 24 | 212 | 144 | >50 | 30 | 0.11 | 740 |
| K-VK-3 | 3.3 | 5.4 | 6.5 | 89 | 197 | 141 | >50 | 38 | 0.09 | 800 |

Example 4: Composite Bodies with a Polymer Layer a) Production of Various Solutions of Perfluorinated Polymers The various solutions for coating were produced in such a way that the corresponding polymer as sourced from the manufacturer was admixed with the appropriate amount of solvent. To assist the dissolving operation, the mixture was heated to 60° C. for several hours until all the polymer had dissolved. The solution cooled down overnight and could be filtered the next day at slightly elevated temperature through a 5 µm paper filter in order to remove the last undissolved constituents (impurities). On completion of filtration, the solution can be stored or processed for several months. The compositions of the solutions produced in Example 4a can be found in Table 5 below. The concentrations were determined with an MA 150Q residue determination balance from Sartorius, Germany. The values correspond to a dry residue [%] after drying at 120° C. Viscosity was determined with a rotary viscometer from Malvern Instruments Limited, Worcestershire, UK, model: Kinexus KNX2112m at a shear rate of 100 s$^{-1}$ and a temperature of 25° C.

TABLE 5

Compositions and parameters of solutions PL 1 to 8

| Polymer solution | Polymer | Weight | Solvent | Weight | Dry residue | Viscosity |
|---|---|---|---|---|---|---|
| PL-1 | Cytop-ctl 109 AE | 28 g | Ct-100-solv | 72 g | 2.5% | 4 |
| PL-2 | Cytop-ctl 107 MK | 36 g | Ct-100-solv | 64 g | 2.5% | 3 |
| PL-3 | Cytop-ctx 109 AE | 45 g | Ct-100-solv | 55 g | 4.0% | 8 |
| PL-4 | Hyflon AD60 | 4 g | Ct-100-solv | 96 g | 4.0% | 9 |
| PL-5 | Hyflon AD60 | 4 g | Novec 7300 | 96 g | 4.0% | 11 |
| PL-6 | Hyflon AD 60 | 3 g | Galden HT55 | 97 g | 3.0% | 6 |
| PL-7 | Hyflon AD60 | 2.8 g | Ct-100-solv | 97 g | 2.8% | 7 |
| PL-8 | Hyflon AD60 | 2.5 g | Ct-100-solv | 97 g | 2.5% | 6 | b) Production of a Polymer Solution (PL-9)

10 g of component A (RTV-615A) in 90 g of hexamethyldisiloxane were initially charged in a round-bottom flask and heated to 60° C. On attainment of the given temperature, 1 g of component B (RTV-615B) in 10 g of hexamethyldisiloxane was added. The components, which mix very well under these conditions, after a stirring time of 2 h, were left to cool and, after dilution with hexamethyldisiloxane to a content of 92% by weight of hexamethyldisiloxane in the solution, the viscosity was checked. This was 13 mPas at first and varied with time and rose continuously. This solution was processed and the composite body was coated as soon as the viscosity was in the range from 5 to 50 mPas. Viscosities were determined with a rotary viscometer from Malvern Instruments Limited, Worcestershire, UK, model: Kinexus KNX2112m at a shear rate of 100 s$^{-1}$ and a temperature of 25° C. The pot life of the ideal processing window is about 2 hours.

c) Production of a Polymer Solution (PL-10)

The solution was obtained by combining solution A and solution B in a (weight) ratio of 1:1. Solution A contained 99.8% by weight of the vinyldimethylpolysiloxane/vinyl-QM resin mixture VQM 906 and 0.2% by weight of catalyst 511. Solution B contained 52.99% by weight of the vinyl-functional polydimethylsiloxane VS 165.000, 38.99% by weight of the SiH-containing polydimethylsiloxane crosslinker 120, 8% by weight of the vinyldimethylpolysiloxane/vinyl-QM resin mixture VQM 906, and 0.02% by weight of the inhibitor methylbutynol. This mixture was diluted with hexamethyldisiloxane directly prior to use, such that the solution used had a hexamethyldisiloxane content of 85% by weight and a viscosity of 9 mPas. The latter was determined with a rotary viscometer from Malvern Instruments Limited, Worcestershire, UK, model: Kinexus KNX2112m at a shear rate of 100 s$^{-1}$ and a temperature of 25° C.

d) Production of a Polymer Solution (PL-11)

10 g of component A (RTV-615A) in 90 g of hexamethyldisiloxane were initially charged in a round-bottom flask and heated to 60° C. On attainment of the given temperature, 1 g of component B (RTV-615B) in 10 g of hexamethyldisiloxane was added. The components, which mix very well under these conditions, after a stirring time of 2 h, were left to cool and, after dilution to a content of 95% by weight of hexamethyldisiloxane in the solution, the viscosity was checked. This was 6 mPas at first and varied with time and rose continuously. This solution was processed and the composite body was coated as soon as the viscosity was in the range from 5 to 50 mPas. The latter was determined with a rotary viscometer from Malvern Instruments Limited, Worcestershire, UK, model: Kinexus KNX2112m at a shear rate of 100 s$^{-1}$ and a temperature of 25° C. The pot life of the ideal processing window is about 2 hours.

e) Production of a Polymer Solution (PL-12)

A solution produced as in c) was diluted with hexamethyldisiloxane to 95% by weight rather than 92% by weight of hexamethyldisiloxane. After homogenization for 2 hours, this was used for the coating.

f) Production of a Polymer Solution (PL-13)

A mixture of 70 g of RC silicone type 702, from Evonik Resource Efficiency GmbH, and 30 g of RC silicone type 902 was mixed with 900 g of isopropanol, from Obermeier GmbH, with vigorous stirring, and 2 g of photoinitiator type 18, from Evonik Resource Efficiency GmbH, were added. This solution was processed within 2 days or stored in the dark under a good seal.

g) Coating of a Composite Body with Polymers

A composite body was predried in a drying cabinet at 100° C. for at least 2 h, then coated by the dip-coating method, as already described in Example 1f. For this purpose, an automated film drawing apparatus from Zehntner was modified such that it uses a pulley mechanism to pull the web material to be coated vertically upward, at a defined speed of 42 mm/s, out of a dip coating apparatus in which one side of the material web is deflected via a roll and hence does not come into contact with the coating solution and the other side of the material web is conveyed through a tank filled with the solution.

For coating, the ready-mixed solution was introduced into a tank in which there was a rotating roll spanned by the material web. The fill level of the tank was adjusted such that only 45° of its circumference of the roll dips into the solution. For good guiding of the material web, and in order to prevent the solution from running along the material web, the web tension was about 0.1 N/cm of material web width. The material web was guided through the solution at a speed of 42 mm/s at room temperature and standard pressure. After the coating had concluded, the material web remained suspended at room temperature in the apparatus for another 15 minutes in order that the solvent could largely evaporate.

Only after drying of the material web at 120° C. overnight in a drying cabinet was it characterized. A correlation of the composite bodies and coating solutions used can be found in Table 6.

Some of the various composite materials, rather than being predried at 100° C., were treated with a corona. For this purpose, the composite body was secured with its front side upward on an electrically nonconductive material, PET nonwoven, from Sojitz, 05-TH-60W, and conveyed through a corona treatment system (from Softal, Hamburg) at a speed of 1.5 m/min. The power of the corona treatment can be variably adjusted. The experimental setting can likewise be found in Table 6.

When RC silicones were used, after the drying, as soon as the solvent had been removed, these were cured with UV light (LAB 200UV laboratory UV device from Eltosch, Hamburg) at a bath speed of 1.5 m/min.

All composite bodies were characterized by determination (executed as specified above) of the clean gas selectivity for $CO_2/CH_4$ and the flow rate of $CO_2$.

TABLE 6

Experimental parameters and results from Example 4g.

| Resulting composite body | Composite body used | Solution utilized | Corona power [W min/m] | Clean gas selectivity $CO_2/CH_4$ | $CO_2$ flow rate [GPU] |
|---|---|---|---|---|---|
| P-VK-1 | K-VK-2 | PL-1 | 0 | 17 | 13 |
| P-VK-2 | K-VK-2 | PL-2 | 0 | 9 | 41 |
| P-VK-3 | K-VK-2 | PL-3 | 0 | 17 | 12 |
| P-VK-4 | K-VK-2 | PL-4 | 0 | 12 | 40 |
| P-VK-5 | K-VK-2 | PL-5 | 0 | 4 | 58 |
| P-VK-6 | K-VK-2 | PL-6 | 0 | 3 | 55 |
| P-VK-7 | K-VK-3 | PL-9 | 600 | 3 | 730 |
| P-VK-8 | K-VK-3 | PL-10 | 600 | 3 | 820 |
| P-VK-9 | P-VK-7 | PL-7 | 200 | 13 | 120 |
| P-VK-10 | P-VK-7 | PL-8 | 200 | 12 | 140 |
| P-VK-11 | P-VK-9 | PL-11 | 400 | 12 | 110 |
| P-VK-12 | P-VK-10 | PL-12 | 400 | 12 | 120 |
| P-VK-13 | P-VK-9 | PL-13 | 400 | 11 | 95 |

Figure 1:
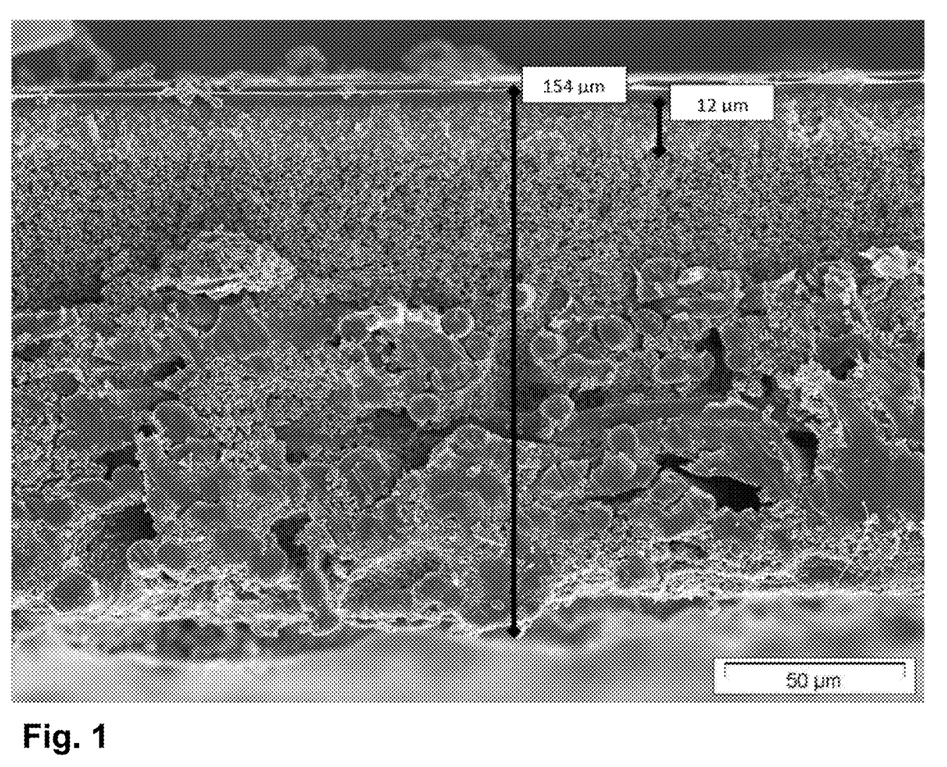
FIG. 1 shows an SEM image of a section through the composite body P-VK-11 (see examples). The various layers (1) and (2), the polymer layer (PS)/coatings (PB) and the fibers of the substrate are apparent. Also given are dimensions for the composite body and layer (2).
Figure 2:
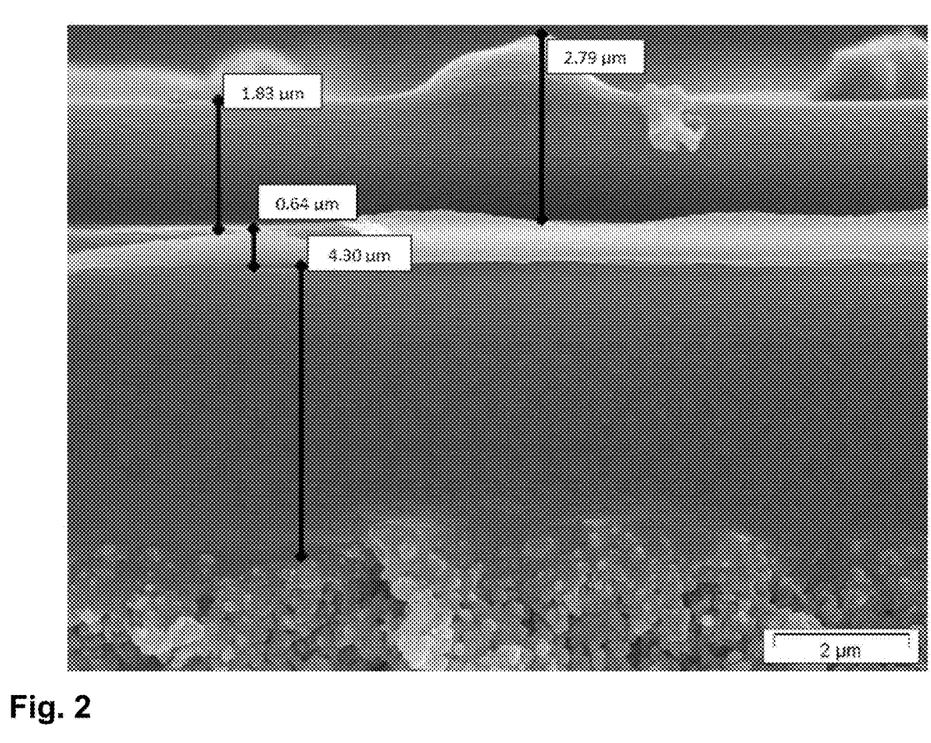
FIG. 2 shows an enlarged SEM image of a section through the composite body P-VK-11 (see examples). The construction of the polymer layer (PS) including polymer coatings (PB) is apparent. Also given are dimensions for polymer coatings (PB) and the polymer layer (PS).

The figures FIG. 1 and FIG. 2 show SEM images of a section through the composite body P-VK-11 in different magnification.

Composite bodies P-VK-9 to P-VK-13 can preferably be used in apparatuses for gas separation since they combine relatively high clean gas selectivities with a high flow rate for carbon dioxide. This makes use in plants for separation of corresponding mixtures efficient, and hence improves the economic viability of the corresponding separation processes.

The composite bodies P-VK11 to P-VK-13 additionally feature quite a good tolerance to the handling of the composite bodies. This reduces the probability of occurrence of faults in or damage to the composite body that can occur during introduction into an apparatus for separation of gas mixtures. Typical faults or damage would be fractures in the ceramic owing to kinks or treatment with sharp objects.

All composite bodies P-VK-1 to 13 are flexible and can be wound without damage around a bar or around a tube having a diameter of down to 15 mm. The composite bodies P-VK-11 to P-VK-13 can be wound onto min/mal diameters of down to 5 mm without damage. The freedom of the corresponding composite bodies from damage can be demonstrated easily by the determination of the clean gas selectivity, which is the same before and after the treatment. In this case, a reduction in the clean gas selectivity by 2 units is assessed as "defect in the composite body".

By virtue of the flexibility of the composite bodies, these are introducible in a very simple manner in typical module forms for flat membranes and are especially suitable for use in spiral-wound modules, plates and frame modules, pocket modules and other apparatuses that have been designed for flat membranes.

By virtue of the ceramic structure of the composite bodies P-VK-1 to 13, the thickness and porosity thereof is virtually unchanged under compressive stress. This is crucial for the entire composite body, even under high compressive stresses, to permit a virtually constant flow performance in GPU, and for the flow not to be reduced at higher pressures by a compacting porous structure.

To determine these characteristics, composite bodies (P-VK-4) were cut out as a circular sample having a diameter of 35 mm and subjected to a pressure of up to 52 bar in a hydraulic press with simultaneous determination of thickness (measuring instrument from INSTRON). A diagram in which the thickness is plotted as a function of compression pressure can be used, after multiple cycles of compressive stress and relaxation, to calculate an elastic component of the change in thickness. This is only 6% for this composite body.

The invention claimed is:

1. A flexible composite gas separation membrane body having, on a porous substrate and in the interstices of the substrate that includes fibers,
    a porous layer (1) composed of oxide particles bonded to one another and partly to the substrate that include at least one oxide selected from oxides of the elements Al, Zr, Ti and Si, and having, at least on one side, a further porous layer;
    (2) including oxide particles bonded to one another and partly to layer (1) that include at least one oxide selected from oxides of the elements Al, Zr, Ti and Si, where the oxide particles present in layer (1) have a greater median particle size than the oxide particles present in layer (2), wherein the median particle size (d50) of the oxide particles in layer (1), is from 0.5 to 4 μm and the median particle size (d50) of the oxide particles in layer (2), is from 0.015 to 0.15 μm;
    and wherein the flexible composite gas separation membrane body has a Gurley number of from 250 to 1200 sec, and a gas flow of greater than 50 GPU for carbon dioxide as clean gas; and
    further comprises a silicone polymer layer; and
    the flexible composite gas separation membrane body has a thickness of from 100 to 400 μm and can be wound around a bar or tube having a diameter of 15 mm or greater.

2. The flexible composite gas separation membrane body according to claim 1, wherein the flexible composite body has a Gurley number of from 300 to 800 sec.

3. The flexible composite gas separation membrane body according to claim 1, wherein the flexible composite body has a thickness of from 100 to 400 μm and has a Gurley number of from 300 to 800 sec.

4. The flexible composite gas separation membrane body according to claim 1, wherein the substrate is a nonwoven fabric, knit or laid scrim.

5. The flexible composite gas separation membrane body according to claim 1, wherein the fibers have a dimension of from 1 to 200 g/km of fiber and are composed of polyacrylonitrile, polyamide, polyester and/or polyolefin.

6. The flexible composite gas separation membrane body according to claim 1, wherein the substrate has a thickness of from 50 to 150 μm and a basis weight of from 40 to 150 g/m$^2$.

7. The flexible composite gas separation membrane body according to claim 1, wherein the flexible composite body has an average pore size of from 60 to 140 nm.

8. The flexible composite gas separation membrane body according to claim 1, wherein the flexible composite body, on the surface of the layer (2), has a surface roughness Sdq of less than 10 μm.

9. The flexible composite gas separation membrane body according to claim 8, wherein a polymer layer (PS) is present atop or above layer (2).

10. The flexible composite gas separation membrane body according to claim 8 having a gas flow of gas flow of greater than 80 GPU for carbon dioxide as clean gas, wherein the silicone in the silicone layer is selected from the group consisting of polydimethylsilicone, polyethylmethylsilicone, nitrile silicone, rubbers, poly(4-methyl-1-pentene), and polytrimethylsilylpropenes.

11. A process for producing a flexible composite gas separation membrane body of claim 1, wherein the process comprises the following steps:
(a) applying a coating composition (BM1) to and into a substrate having fibers and interstices between the fibers, where the coating composition is produced by combining
(a1) a dispersion (D1) of oxide particles produced by mixing oxide particles selected from the oxides of the elements Ti, Al, Zr and/or Si and having a median particle diameter (d50) of from 0.5 to 4 μm with water, an inorganic acid, and a dispersing aid,
(a2) a dispersion (D2) of oxide particles produced by mixing oxide particles selected from the oxides of the elements Ti, Al, Zr and/or Si and having a median particle diameter (d50) of from 15 to 150 nm, with water,
(a3) a binder formulation (BF1), produced by mixing at least two organofunctional silanes with an alkanol, an inorganic acid, and water,
(b) consolidating the coating composition (BMI) at a temperature of from 100° C. to 275° C., in order to create a first layer (SI'),
(c) optionally applying a coating composition (BM2) to at least layer (S1'), where the coating composition (BM2) is produced by combining
(c1) a dispersion (D3) of oxide particles produced by mixing oxide particles selected from the oxides of the elements Ti, Al, Zr and/or Si and having a median particle diameter (d50) of from 0.5 to 4 μm with water, an inorganic acid, and a dispersing aid,
(c2) a dispersion (D4) of oxide particles produced by mixing oxide particles selected from the oxides of the elements Ti, Al, Zr and/or Si and having a median particle diameter (d50) of from 15 to 150 nm, with water,
(c3) a binder formulation (BF2), produced by mixing at least two organofunctional silanes with an alkanol, an inorganic acid, and water,
(d) optionally consolidating the coating composition (BM2) at a temperature of from 100° C. to 275° C., in order to create a second layer (S2'),
(e) applying a coating composition (BM3) to layer (S1') or, if present, layer (S2'), where the coating composition (BM3) has been produced by combining water and an inorganic acid with an
(e1) aqueous dispersion (D5) including oxide particles selected from the oxides of the elements Ti, Al, Zr and/or Si and having a median particle diameter (d50) of from 15 to 150 nm, and with ethanol and with a
(e2) binder formulation (BF3) comprising at least two organofunctional silanes,
(f) consolidating the coating composition at a temperature of from 100° C. to 275° C., in order to create a layer (S3'),
(g) optionally applying a coating composition (BM4) to layer (S3'), where the coating composition (BM4) has been produced by combining water and an inorganic acid with an
(g1) aqueous dispersion (D6) including oxide particles selected from the oxides of the elements Ti, Al, Zr and/or Si and having a median particle diameter of from 15 to 150 nm, and with ethanol and with a
(g2) binder formulation (BF4) comprising at least two organofunctional silanes,
(h) optionally consolidating the coating composition at a temperature of from 100° C. to 275° C., in order to create a layer (S4'), and
(i) conducted after step (0 or after step (h), a polymer layer (PS) including a polymer is applied to layer (S3') or to layer (S4').

12. The process according to claim 11, wherein the organofunctional silanes are selected from the group consisting of 3-glycidyloxytriethoxysilane, methyltriethoxysilane and tetraethoxysilane.

13. The process according to claim 11, wherein 3-glycidyloxytriethoxysilane, methyltriethoxysilane and tetraethoxysilane are used in binder formulation (BF1) and (BF2) in a mass ratio of from 2 to 4:0.5 to 1.5:1.

14. The process according to claim 11, wherein 3-glycidyloxytriethoxysilane, methyltriethoxysilane and tetraethoxysilane are used in binder formulation (BF3) and (BF4) in amass ratio of from 0.5 to 1.5:1.5 to 2.5:1.

15. The process according to claim 11, wherein the coating compositions (BM3) and (BM4) are of identical composition.

16. The process according to claim 11, wherein the coating compositions (BM1) and (BM2) are of identical composition.

17. The process according to claim 11, wherein the substrate used is a polymer nonwoven including fibers selected from the group consisting of polyacrylonitrile, polyester, polyamide and polyolefin.

18. The process according to claim 11, wherein the consolidating is affected by passage through a hot air oven or an IR oven.

19. The process according to claim 11, wherein, before and/or after the applying of the silicone polymer layer (PS), a polymer coating (PB) containing polymer, is applied.

20. A gas separation membrane for separation of chemicals selected from the group consisting of methane from $CO_2$, $H_2$ from $CO_2$, $H_2$ from $N_2$, $O_2$ from $N_2$, and He from $CH_4$, wherein the gas separation membrane comprises the flexible composite material according to claim 1 as gas separation membrane, for separation of methane from $CO_2$, $H_2$ from $CO_2$, $H_2$ from $N_2$, $O_2$ from $N_2$ or He from $CH_4$.

21. A gas separation apparatus comprising the flexible composite gas separation membrane body according to claim 1.

* * * * *

UNITED STATES PATENT AND TRADEMARK OFFICE
CERTIFICATE OF CORRECTION

PATENT NO. : 11,596,904 B2
APPLICATION NO. : 16/702752
DATED : March 7, 2023
INVENTOR(S) : Christian Hying et al.

It is certified that error appears in the above-identified patent and that said Letters Patent is hereby corrected as shown below:

In the Claims

Column 32,
Line 14, "after step (0 or" should read -- after step (f) or --.

Signed and Sealed this
Eleventh Day of April, 2023

Katherine Kelly Vidal
Director of the United States Patent and Trademark Office